(12) United States Patent
Ihm et al.

(10) Patent No.: US 8,750,175 B2
(45) Date of Patent: Jun. 10, 2014

(54) APPARATUS AND METHOD FOR TRANSCEIVING A SIGNAL USING A PREDETERMINED FRAME STRUCTURE IN A WIRELESS COMMUNICATION SYSTEM

(75) Inventors: Binchul Ihm, Anyang-si (KR); Wookbong Lee, Anyang-si (KR); Moonil Lee, Anyang-si (KR); Sunam Kim, Anyang-si (KR); Hyunsoo Ko, Anyang-si (KR); Sungho Park, Anyang-si (KR); Jaho Koo, Anyang-si (KR); Jinyoung Chun, Anyang-si (KR); Seunghyun Kang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 13/497,238

(22) PCT Filed: Sep. 20, 2010

(86) PCT No.: PCT/KR2010/006483
§ 371 (c)(1),
(2), (4) Date: Mar. 20, 2012

(87) PCT Pub. No.: WO2011/034401
PCT Pub. Date: Mar. 24, 2011

(65) Prior Publication Data
US 2013/0170409 A1    Jul. 4, 2013

Related U.S. Application Data

(60) Provisional application No. 61/244,071, filed on Sep. 20, 2009.

(30) Foreign Application Priority Data

Sep. 17, 2010   (KR) .................. 10-2010-0091856

(51) Int. Cl.
*H04B 7/26*    (2006.01)

(52) U.S. Cl.
USPC ............ 370/294; 370/344; 370/277; 370/295

(58) Field of Classification Search
USPC .................. 370/294, 295, 277, 344, 470
See application file for complete search history.

(56) References Cited

U.S. PATENT DOCUMENTS

2009/0245187 A1* 10/2009 Nam et al. .............. 370/329
2009/0257523 A1* 10/2009 Varadarajan et al. ......... 375/295

(Continued)

FOREIGN PATENT DOCUMENTS

KR    1020080016390    2/2008
KR    1020090089767    8/2009

OTHER PUBLICATIONS

Motorola, "EUTRA Downlink Numerology", R1-050520, 3GPP TSG RAN1#41 Meeting, May 2005.

*Primary Examiner* — Brian D Nguyen
(74) *Attorney, Agent, or Firm* — Lee, Hong, Degerman, Kang & Waimey

(57) ABSTRACT

Disclosed are an apparatus and method for transceiving a signal using a frame structure appropriate for a high-speed moving body. The method for transceiving a signal using a predetermined frame structure according to the present invention comprises a step of transceiving a signal via a frame having the predetermined frame structure, wherein one frame is constituted by eight subframes, and said frame consists of a type-1 subframe consisting of six orthogonal frequency division multiple access (OFDMA) symbols and a type-2 subframe consisting of seven OFDMA symbols, and said frame has a cyclic prefix length which is either 0, 1/32 of the useful symbol length, 1/64 of the useful symbol length, or 1/128 of the useful symbol length.

14 Claims, 7 Drawing Sheets

(56) References Cited

U.S. PATENT DOCUMENTS

| | | | |
|---|---|---|---|
| 2009/0270122 A1* | 10/2009 | Chmiel et al. | 455/550.1 |
| 2009/0290538 A1* | 11/2009 | Kim et al. | 370/328 |
| 2009/0296645 A1* | 12/2009 | Bui | 370/329 |
| 2010/0008284 A1* | 1/2010 | Chae et al. | 370/315 |
| 2010/0074244 A1* | 3/2010 | Luo et al. | 370/343 |
| 2010/0238845 A1* | 9/2010 | Love et al. | 370/280 |
| 2010/0296429 A1* | 11/2010 | Han et al. | 370/312 |
| 2010/0296477 A1* | 11/2010 | Hason et al. | 370/330 |

* cited by examiner

FIG. 6
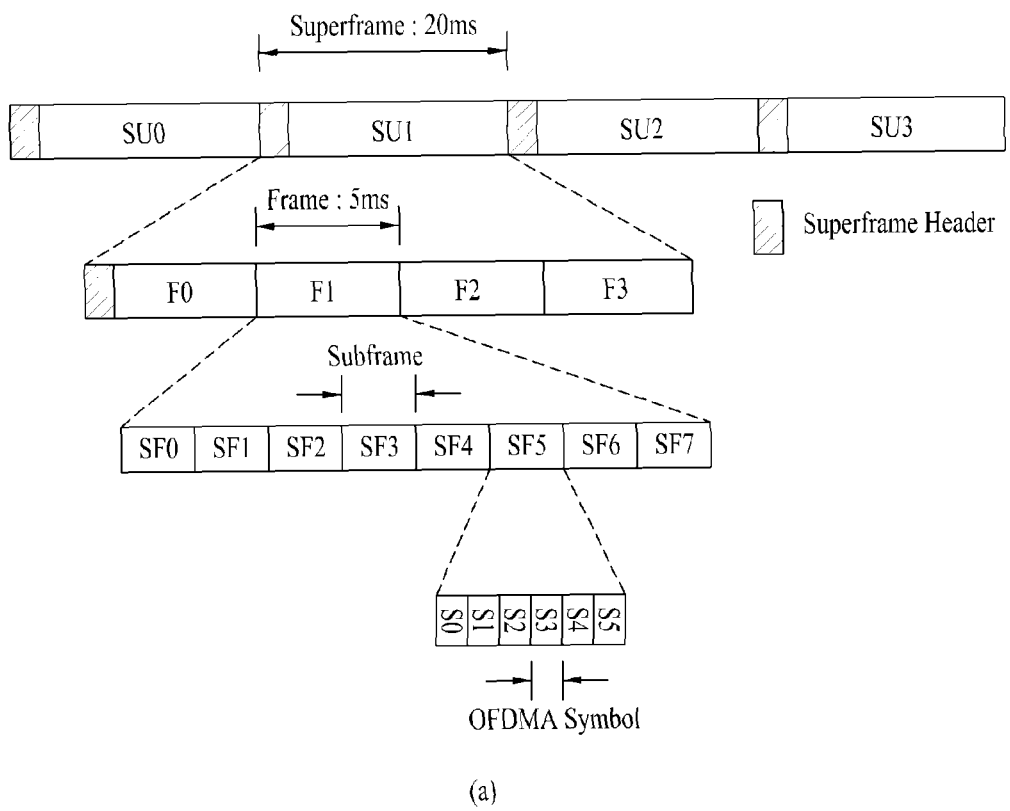
(a)
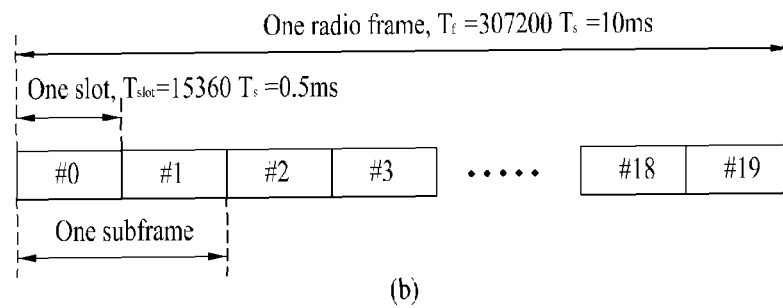
(b)

APPARATUS AND METHOD FOR TRANSCEIVING A SIGNAL USING A PREDETERMINED FRAME STRUCTURE IN A WIRELESS COMMUNICATION SYSTEM

CROSS-REFERENCE TO RELATED APPLICATIONS

This application is the National Stage filing under 35 U.S.C. 371 of International Application No. PCT/KR2010/006483, filed on Sep. 20, 2010, which claims the benefit of earlier filing date and right of priority to Korean Application No. 10-2010-0091856, filed on Sep. 17, 2010, and also claims the benefit of U.S. Provisional Application Serial No. 61/244,071, filed on Sep. 20, 2009, the contents of which are all incorporated by reference herein in their entirety.

TECHNICAL FIELD

The present invention relates to a wireless communication system, and more particularly, to an apparatus and method for transceiving a signal using a predetermined frame structure.

BACKGROUND ART

Currently discussed 4G cellular communication systems are designed on the basis of one basic frame to optimize their performances for users moving at a low speed. Though these systems are designed such that they can support users moving at a high speed of 350 km/h, their performance for high-speed users is considerably lower than those for low-speed users.

If these cellular communication systems are applied to a high-speed train without being modified, link quality between a network and the high-speed train decreases and sufficient link capacity is difficult to obtain because of high mobility of the high-speed train moving at 350 km/h.

Therefore, it is expected that performance deterioration of the cellular communication systems will become severe, thus remarkably degrading wireless data service for passengers if the velocity of the train exceeds 500 km/h. Furthermore, some of the capacity of a macro base station will be used by the high-speed train, and thus data communication of other users in the corresponding cell will be disturbed.

Wired communication instead of wireless communication may be used between the high-speed train and a network. For example, communication is performed between the high-speed train and the network through an AC signal using the tracks coming into contact with the high-speed train. However, this communication system has disadvantages that the tracks have small capacity and a larger number of links are difficult to generate because the number of tracks with which the high-speed train simultaneously comes into contact is limited to two.

In addition, PLC (Power Line Communication) using a power line may be used for communication of a moving body. However, this communication scheme has the same disadvantages as the communication scheme using the tracks and cannot be applied to trains having no power line.

As described above, it is difficult for the conventional frame structure, antenna arrangement and communication systems to secure link capacity and link quality for a high-speed moving body. However, no scheme for solving this problem has been studied or proposed.

DETAILED DESCRIPTION OF THE INVENTION

Technical Problems

An object of the present invention is to provide a method for transceiving a signal using a predetermined frame structure in a wireless communication system.

Another object of the present invention is to provide an apparatus for transceiving a signal using a predetermined frame structure in a wireless communication system.

Technical problems to be solved by the present invention are not limited to the above-mentioned technical problem, and other technical problems not mentioned above can be clearly understood by one skilled in the art from the following description.

Technical Solutions

In an aspect of the present invention, a method for transceiving signals using a predetermined frame structure in a wireless communication system includes transceiving signals via a frame based on the predetermined frame structure, wherein one frame is constituted by 8 subframes in the frame structure, and the frame consists of a type-1 subframe consisting of 6 OFDMA (Orthogonal Frequency Division Multiple Access) symbols and a type-2 subframe consisting of 7 OFDMA symbols, and the frame has a CP (Cyclic Prefix) time which is either 0, 1/32 of a effective symbol time, 1/64 of the effective symbol time, or 1/128 of the effective symbol time.

The frame may be a TDD (Time Division Duplex) frame or a FDD (Frequency Division Duplex) frame.

The FDD frame may consist of 2 Type-1 subframes and 6 Type-2 subframes when the CP time is 0 or 1/128 of the effective symbol time. The FDD frame may consist of 3 Type-1 subframes and 5 Type-2 subframes when the CP time is 1/32 or 1/64 of the effective symbol time.

The TDD frame may consist of 3 Type-1 subframes and 5 Type-2 subframes when the CP time is 0 or 1/128 of the effective symbol time. The TDD frame may consist of 4 Type-1 subframes and 4 Type-2 subframes when the CP time is 1/32 or 1/64 of the effective symbol time.

In another aspect of the present invention, a method for transceiving signals using a predetermined frame structure in a wireless communication system includes transceiving signals via a frame based on the predetermined frame structure, wherein one frame is constituted by 10 subframes in the predetermined frame structure, each subframe consisting of 2 slots including 15 OFDMA symbols, and the frame has a CP time of 0.

The 2 slots of each subframe may respectively consist of 7.5 OFDMA symbols, or the first slot of each subframe may consist of 7 OFDMA symbols and the second slot may consist of 8 OFDMA symbols.

In another aspect of the present invention, an apparatus for transceiving signals using a predetermined frame structure in a wireless communication system includes a processor configured to control operation to transceiver signals via a frame based on the predetermined frame structure, wherein one frame is constituted by 8 subframes in the predetermined frame structure, and the frame consists of a type-1 subframe consisting of 6 OFDMA symbols and a type-2 subframe consisting of 7 OFDMA symbols, and the frame has a CP time which is either 0, 1/32 of an effective symbol time, 1/64 of the effective symbol time, or 1/128 of the effective symbol time.

In another aspect of the present invention, an apparatus for transceiving signals using a predetermined frame structure in a wireless communication system includes a processor configured to control operation to transceive signals via a frame based on the predetermined frame structure, wherein one frame is constituted by 10 subframes in the predetermined frame structure, each subframe consisting of 2 slots including 15 OFDMA symbols, and the frame has a CP time of 0.

Advantageous Effects

When a signal is transmitted/received using the frame structure according to the present invention, it is possible to provide high-quality communication services securing link capacity and quality to a user moving at a high speed.

Furthermore, communication performance for a user moving at a high speed can be improved by using the frame structure according to the present invention.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 6(a) and 6(b) illustrate exemplary frame structures of an IEEE 802.16m system and a 3GPP LTE system, respectively.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. For example, while the following detailed description includes specific details in order to provide a thorough understanding of the present invention, it will be apparent to those skilled in the art that the present invention may be practiced without such specific details. For example, the following detailed description is given under the assumption that a $3^{rd}$ Generation Partnership Project Long Term Evolution (3GPP LTE) mobile communication system is being used. However, the description is applicable to any other mobile communication system except for specific features inherent to the 3GPP LTE system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a User Equipment (UE) is assumed to refer to a mobile or fixed user end device such as a Mobile Station (MS), an Advanced Mobile Station (AMS), etc. and the term 'Base Station (BS)' is assumed to refer to any node of a network end, such as a Node B, an enhanced Node B (eNB or eNode B), an Access Point (AP), etc., communicating with a UE.

In a mobile communication system, an MS may receive information from a BS on a downlink and transmit information to the BS on an uplink. The information that the MS transmits or receives includes data and various types of control information. There are many physical channels according to the types and usages of information that the MS transmits or receives.

Figure 1:
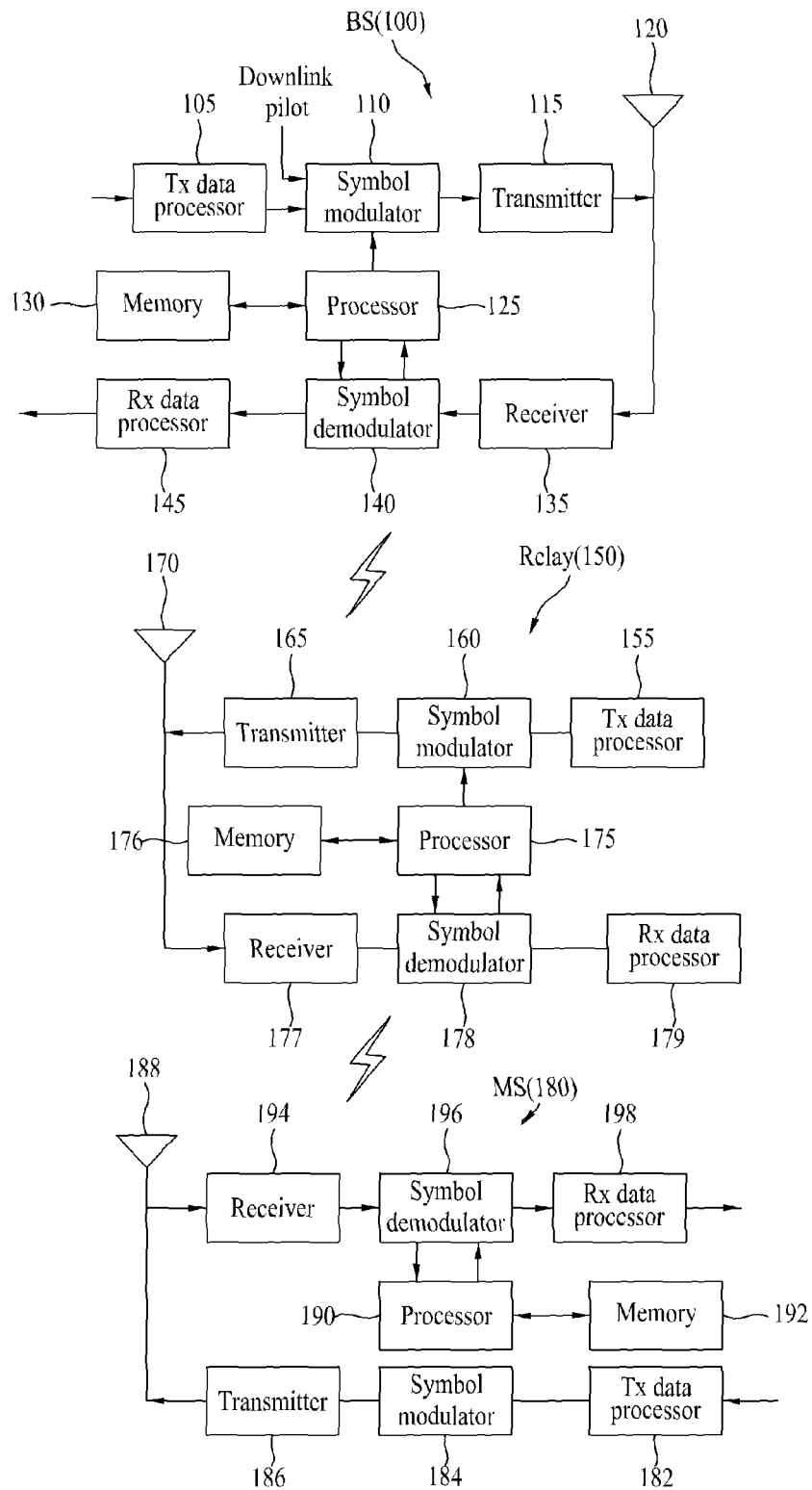
FIG. 1 is a block diagram illustrating a configuration of a communication system according to the present invention.

FIG. 1 is a block diagram illustrating a configuration of a communication system according to the present invention.

The communication system according to the present invention may include a BS 100, a relay 150, an MS 180, and a network (not shown). While one BS 100, one relay 150 and one MS are illustrated to show the configuration of the communication system in a simplified manner, the communication system can include a plurality of BSs, relays and MSs.

Referring to FIG. 1, the BS 100 may include a transmission (Tx) data processor 105, a symbol modulator 110, a transmitter 115, a transceiving antenna 120, a processor 125, a memory 130, a receiver 135, a symbol demodulator 140, and a reception (Rx) data processor 145. The relay 150 may include a Tx data processor 155, a symbol modulator 160, a transmitter 165, a transceiving antenna 170, a processor 175, a memory 176, a receiver 177, a symbol demodulator 178, and a Rx data processor 179. The MS 180 may include a Tx data processor 182, a symbol modulator 184, a transmitter 186, a transceiving antenna 188, a processor 190, a memory 192, a receiver 194, a symbol demodulator 196, and an Rx data processor 198.

While FIG. 1 illustrates one antenna 120, 180 and 188 for each of the BS 100, relay 150 and MS 180, each of the BS 100, relay 150 and MS 180 includes a plurality of antennas. That is, the BS 100, relay 150 and MS 180 according to the present invention support a MIMO (Multiple Input Multiple Output) system. The BS 100, relay 150 and MS 180 according to the present invention can support both SU-MIMO (Single User-MIMO) and MU-MIMO (Multi-User MIMO).

The Tx data processor 105 of the BS 100 receives traffic data, formats and codes the received traffic data, interleaves the coded traffic data and modulates (or symbol-maps) the interleaved traffic data to provide modulated symbols ("data symbols") on downlink. The symbol modulator 110 of the BS 100 receives and processes the data symbols and pilot symbols to provide symbol streams.

The symbol modulator 110 of the BS 100 multiplexes the data symbols and the pilot symbols and transmits the multiplexed data symbols and pilot symbols to the transmitter 115. Here, each transmitted symbol may be a data symbol, a pilot symbol, or a zero signal value. In each symbol interval, the pilot symbols may be continuously transmitted. The pilot symbols may be FDM (Frequency Division Multiplexing) symbols, OFDM (Orthogonal Frequency Division Multiplexing) symbols, TDM (Time Division Multiplexing) symbols, or CDM (code Division Multiplex) symbols.

The transmitter 115 of the BS 100 receives the symbol streams, transforms the received symbol streams into one or more analog signals, and additionally adjusts (e.g. amplifies, filters, and up-converts) the analog signals to generate a downlink signal suitable for transmission through a radio channel. The downlink signal is transmitted to the MS 180 through the antenna 120.

The transceiving antenna 170 of the relay 150 can receive the downlink signal from the BS 100. The processor 175 of the relay 150 can demodulate the received downlink signal and transmit the demodulated signal through the transceiving antenna 170. In addition, the transceiving antenna 170 of the relay 150 can receive an uplink signal from the MS 200. The processor 175 of the relay 150 can demodulate the received uplink signal and transmit the demodulated signal to the BS 100.

In the MS 200, the antenna 188 receives the downlink signal from the BS 100 or the relay 150 and provides the received downlink signal to the receiver 194. The receiver 194 adjusts (e.g. filters, amplifies, and down-converts) the received downlink signal and digitizes the adjusted signal to acquire samples. The symbol demodulator 196 demodulates the received samples and provides the same to the processor 190 for channel estimation.

In addition, the symbol demodulator 196 receives a frequency response estimation value for the downlink from the processor 190, demodulates received data symbols to acquire data symbol estimation values (which are estimation values of transmitted data symbols), and provides the data symbol estimation values to the Rx data processor 198. The Rx data processor 198 demodulates (i.e., symbol-demaps), deinterleaves, and decodes the data symbol estimation values to recover the traffic data transmitted from the BS 100.

Processing of the symbol demodulator 196 and Rx data processor 198 is complementary to processing of the symbol modulator 110 and the Tx data processor 105 of the BS 100.

The Tx data processor 198 of the MS 180 processes traffic data to provide data symbols on uplink. The symbol modulator 184 receives the data symbols, multiplexes the received data symbols with pilot symbols to modulate the data symbols so as to provide symbol streams to the transmitter 186. The transmitter 186 receives and processes the symbol streams to generate an uplink signal. This uplink signal is transmitted to the BS 100 or the relay 150 through the antenna 188.

The BS 100 receives the uplink signal from the MS 180 through the antenna 120. The receiver 135 of the BS 100 processes the received uplink signal to acquire samples. The symbol demodulator 140 processes the samples to provide pilot symbols and data symbol estimation values with respect to the received uplink signal. The Rx data processor 145 processes the data symbol estimation values to recover the traffic data transmitted from the MS 180.

The processors 125, 175 and 190 of the BS 100, relay 150 and MS 180 direct (e.g. control, adjust, and manage) operations of the BS 100, relay 150 and MS 180, respectively. The processors 125, 175 and 190 can be respectively connected to the memories 130, 176 and 192 storing program codes and data. The memories 130, 176 and 192 are respectively connected to the processors 125, 175 and 190 to store operating systems, applications and general files.

The processors 125, 175 and 190 can be called controllers, microcontrollers, microprocessors, microcomputers, etc. The processors 125, 175 and 190 may be configured in hardware, firmware, software, or as a combination thereof. When embodiments of the present invention are implemented using hardware, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) which are adapted to implement the present invention may be included in the processors 125, 175 and 190.

On the other hand, if embodiments of the present invention are implemented using firmware or software, the firmware or software may be configured to include a module, a procedure, a function, etc. which performs functions or operations according to the present invention. The firmware or software may be included in the processors 125, 175 and 190, or stored in the memories 130, 176 and 192 and invoked from the memories 130, 176 and 192 by the processors 125, 175 and 190.

The layers of radio interface protocols between the BS 100, relay 150 and MS 180, and a wireless communication system (network) may be classified into Layers 1, 2 and 3 (L1, L2 and L3) based on the three lowest layers of the Open System Interconnection (OSI) model. A physical layer corresponds to L1 and provides an information transmission service on physical channels. A Radio Resource Control (RRC) layer corresponds to L3 and provides radio control resources between the MS 180 and the network. The BS 100, relay 150 and MS 180, and the network exchange RRC messages through the RRC layer.

Communication methods that a passenger on a high-speed train can use may include a method of allowing the passenger to directly access a mobile communication network and a method of linking the passenger and a network using the high-speed train as a relay. The latter can enable exchange of a larger amount of data between the passenger and the network through an advanced method such as CL-MIMO (Closed Loop-MIMO) because it reduces the number of handover procedures, as compared to the former method, and there is no relative velocity between the relay and the passenger in the latter method. The present invention proposes a method that can be used to maximize link capacity between the network and the high-speed train when the high-speed train acts as a linkage for data communication between the passenger and the network as in the latter communication method.

Descriptions will be given of a communication system having a physical channel environment which has been artificially modified in order to increase link capacity between a network and a high-speed train and a frame structure suitable for this communication system.

Figure 2:
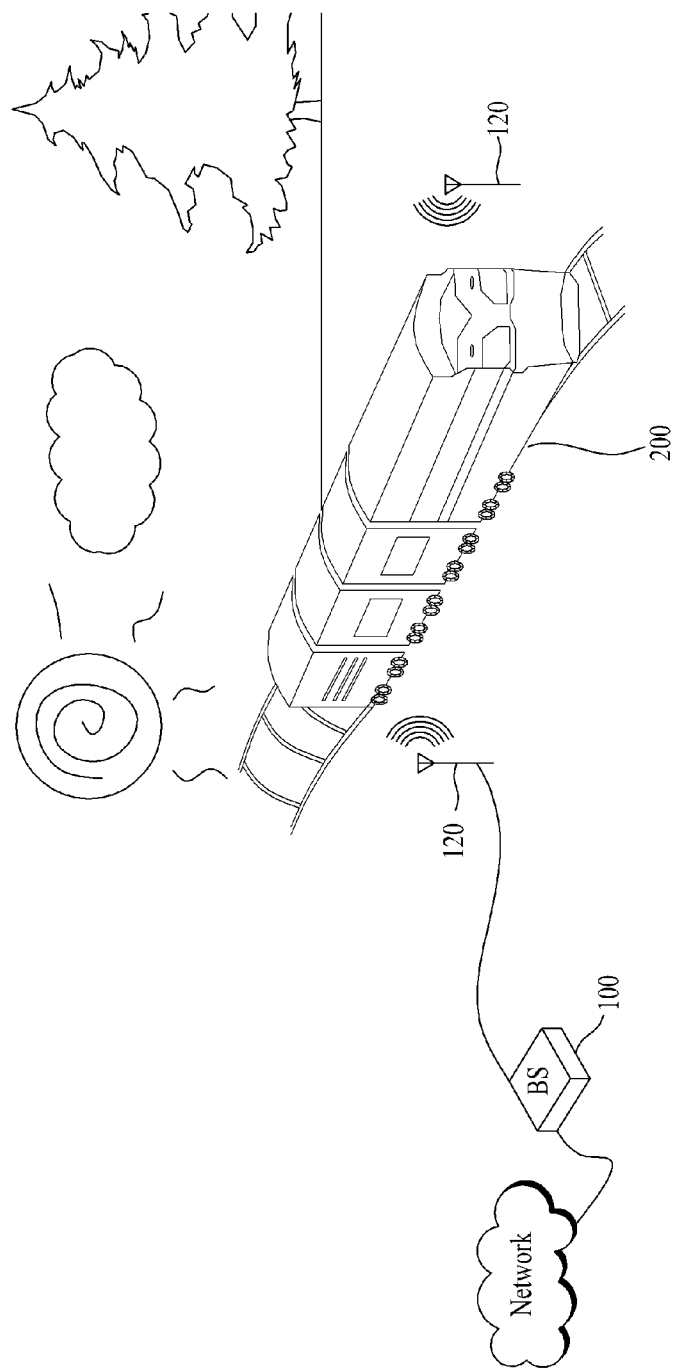
FIG. 2 illustrates an exemplary communication system according to the present invention.

FIG. 2 illustrates an exemplary communication system according to the present invention.

Referring to FIG. 2, the communication system includes a network and a BS 100 linked to the network. The BS 100 can be various types of BSs such as an AP (Access Point), Macrocell BS, Femtocell BS, etc. BSs may be arranged at predetermined intervals along a track or railroad of a high-speed moving body 200 (a high-speed train is exemplified as the high-speed moving body in the following description). The BS 100 covers a specific area and may include a plurality of antennas 120.

The plurality of antennas 120 of the BS 100 can be arranged on both sides of the track of the high-speed train 200 at predetermined intervals. The BS 100 can be connected to the plurality of antennas 120 in a wireless or wired manner. Reception antennas of the high-speed train 200 are arranged at both sides of the high-speed Train 200 and form an LOS (Line Of Sight) with the antennas of the BS 100. The communication system can support MIMO in this antenna arrangement of the BS 100 and the high-speed train 200.

The MIMO system is drawing attention as a broadband wireless communication technology. The MIMO system improves data communication efficiency using a plurality of antennas. The MIMO system can be divided into an SM (Spatial Multiplexing) scheme and an SD (Spatial Diversity)

scheme based on whether different pieces of data are transmitted or the same data is transmitted. The SM scheme transmits data at a high rate without increasing a system bandwidth by transmitting different pieces of data through a plurality of transmit antennas whereas the SD scheme transmits the same data through a plurality of transmit antennas to obtain transmit diversity. An example of the SD scheme is space time channel coding.

In addition, MIMO can be classified into an open loop scheme and a closed loop scheme according to whether a receiver feeds channel information back to a transmitter. The open loop scheme includes BLAST in which a transmitter transmits information in parallel and a receiver detects a signal using ZF (Zero Forcing) and MMSE (Minimum Mean Square Error) repeatedly so as to increase the amount of information to a level corresponding to the number of transmit antennas, and STTC (Space-Time Trellis Code) capable of obtaining transmit diversity and coding gain using a space domain. The closed loop scheme includes a TxAA (Transmit Antenna Array).

The antenna arrangement between the BS 100 and the high-speed train 200, described with reference to FIG. 2, is useful to induce very low CCI (Co-Channel Interference) between transmit antennas because waves are physically blocked by the body of the high-speed train 200. That is, this antenna arrangement can secure spatial multiplexing order (or rank 2), one of MIMO schemes. If waves can be blocked using the body of the high-speed train 200, the antennas of the BS 100 may be located on the ground of the track and the roof of the high-speed train 200. Furthermore, if transmit/receive antennas are arranged in a cross polarization form based on the track, up to spatial multiplexing order 4 can be ensured.

Polarization diversity is a frequency efficiency enhancement scheme for use in a mobile communication system in which neighboring cell BSs use different frequencies, such as AMPS (Advanced Mobile Phone System), TDMA (Time Division Multiple Access), B-WLL (Broadband Wireless Local Loop) or the like, which is a first-generation cellular communication system, rather than CDMA (Code Division Multiple Access). The Polarization diversity cross-polarizes two frequency signals using a single antenna. The polarization diversity can mix two frequency signals having quadrature phases that do not interfere with each other to use the signals for a single antenna. This enables neighboring cells to reuse the same frequency to increase link capacity.

Figure 3:
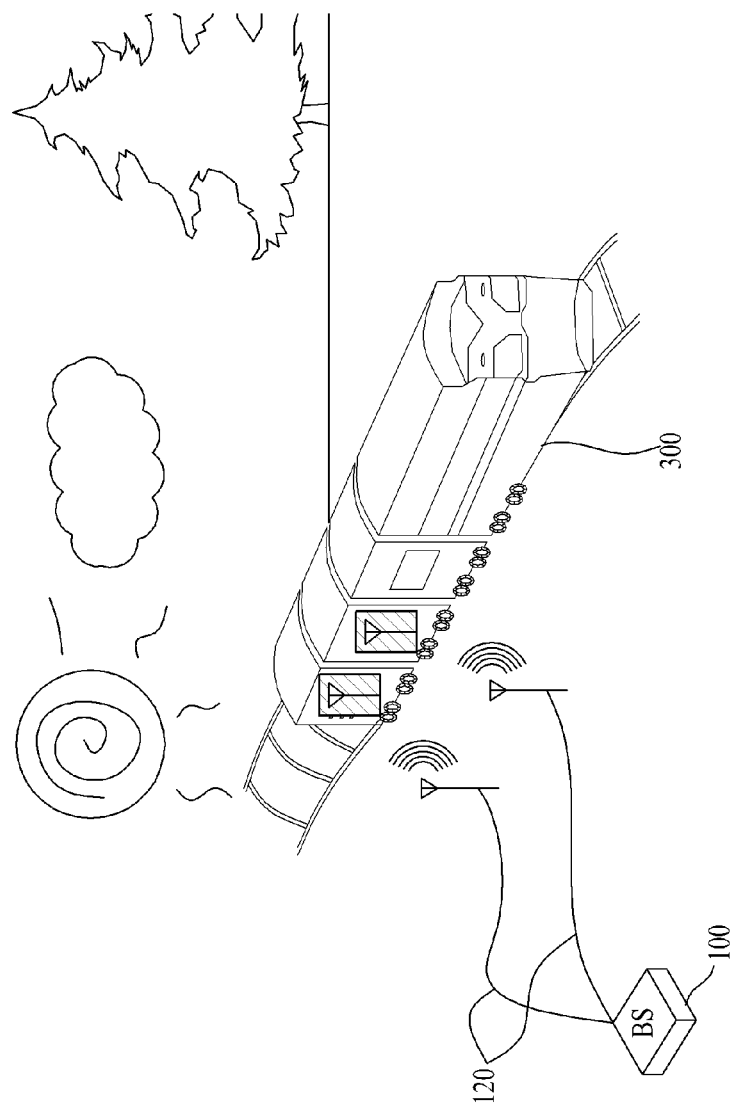
FIG. 3 illustrates an exemplary communication system according to the present invention.

FIG. 3 illustrates an exemplary communication system according to the present invention.

Referring to FIG. 3, if a high-speed train 300 is sufficiently long, a large number of reception antennas can be installed. That is, as the antennas 120 of the BS 100 are arranged in a distributed manner, the processor 125 of the BS 100 can control transmit power of each transmit antenna (or each transmit antenna group) such that one transmit antenna (or transmit antenna group) can affect only one reception antenna (or reception antenna group) of the high-speed train 300. In this case, spatial multiplexing order increases to a level corresponding to the number of transmit antennas (or transmit antenna groups) of the BS 100, and thus it is possible to secure large link capacity between the BS 100 and the high-speed train 30.

One antenna (or antenna group) of the high-speed train 300 and one antenna (or antenna group) of the BS 100 can establish a link. A transmit antenna group of the BS 100 can include one or more physical antennas, and transmit antenna groups share the same pilot structure and sequence. A reception antenna group of the high-speed train 300 can also include one or more physical antennas. One reception antenna group can be configured and arranged in each car of the high-speed train 300.

Figure 4:
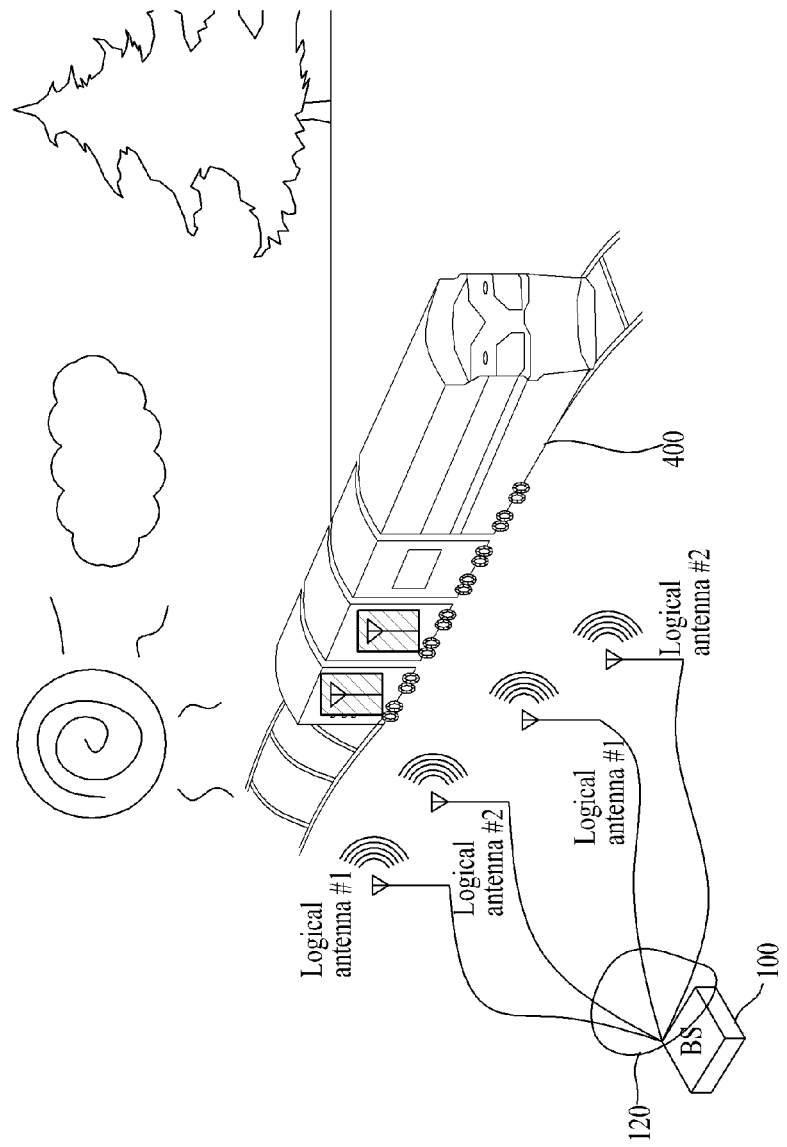
FIG. 4 illustrates an exemplary communication system according to the present invention.

FIG. 4 illustrates an exemplary communication system according to the present invention.

As shown in FIG. 4, if the section of a track or railroad of a high-speed train 400, which needs to be covered by one BS 100, is long, the transmit antennas 120 of the BS 100 are arranged along the track or railroad with transmit antenna logical indexes assigned to the transmit antennas 120 in a circulative manner such that spatial multiplexing order can be maintained irrespective of the point that the high-speed train 400 passes by.

Referring to FIG. 4, four physical transmit antennas 120 of the BS 100 can be installed along the track with logical antenna indexes 1 and 2 assigned for the transmit antennas 120 in a circulative manner. In other words, two logical indexes are used for the four physical transmit antennas 120 of the BS 100 to secure spatial multiplexing order 2 for the high-speed train 400. That is, it is possible to provide a data transmission link with spatial multiplexing order 2 for the high-speed train 400 if the high-speed train 400 is in an area in which the transmit antennas 120 of the BS 100 are installed (i.e., the coverage of the BS 100). Here, spatial multiplexing order 2 means that reception antennas (or reception antenna group) of the high-speed train 400 can receive two independent streams from the transmit antennas 120 with logical antenna indexes 1 and 2 of the BS 100.

Alternatively, the BS 100 can correctly designate actually activated antennas and may not use other antennas for actual transmission when the BS 100 recognizes the exact location of the high-speed train 400 through GPS (Global Positioning System) and the like.

Figure 5:
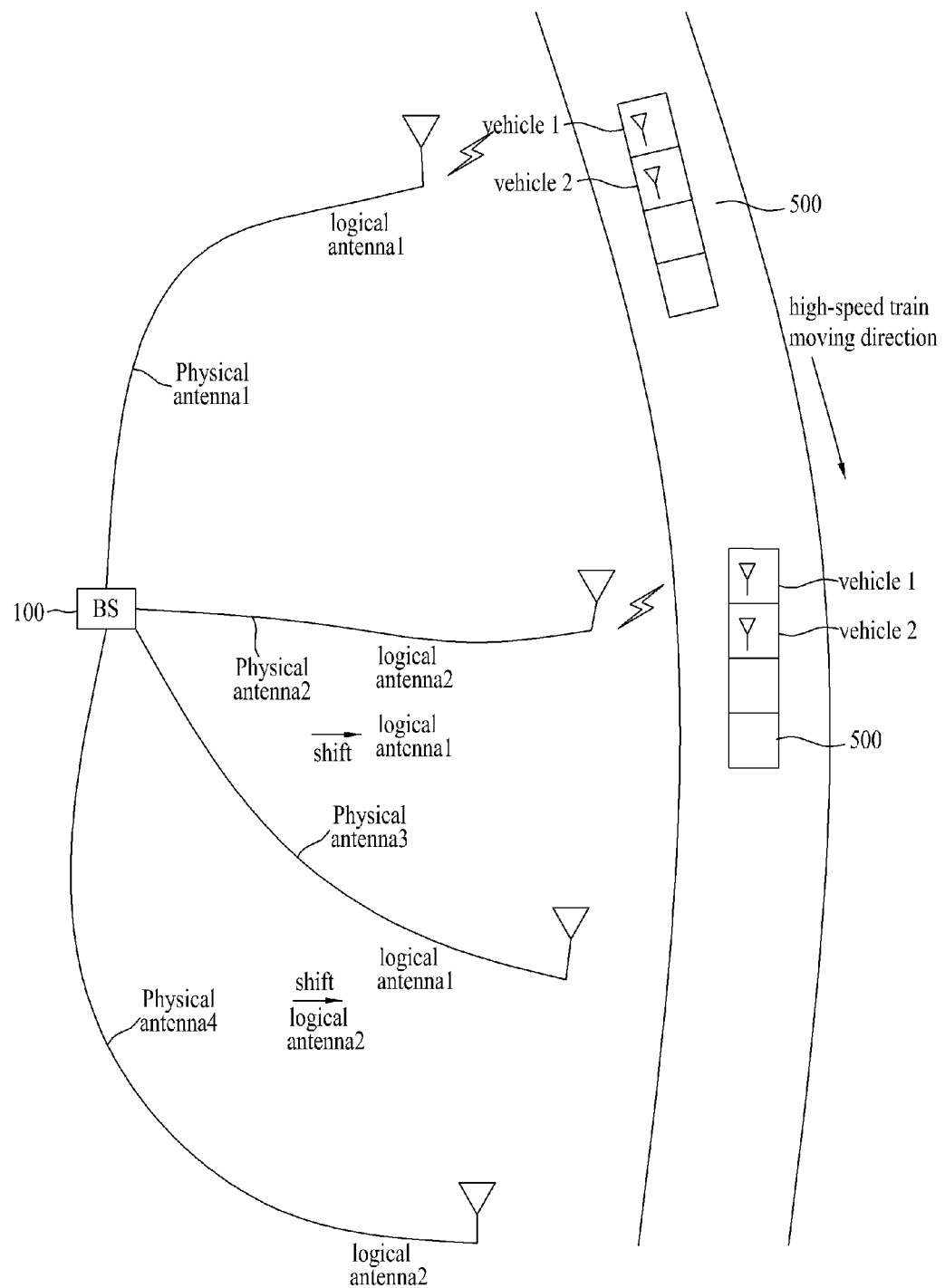
FIG. 5 is a view referred to for describing a method for shifting a logical antenna index as a high-speed train moves.

FIG. 5 is a view referred to for describing a method of shifting a logical antenna index while a high-speed train runs.

If the section of a track or railroad of a high-speed train 500, which needs to be covered by one BS 100, is long, the BS 100 can transmit two independent streams to the high-speed train 500 using physical antennas #1 and #2. That is, spatial multiplexing order 2 can be provided for the high-speed train 500 in the coverage of the BS 100. As shown in FIG. 5, the BS can transmit two independent streams to the high-speed train 500 using physical antennas #3 and #4 while the high-speed train 500 runs. If logical antenna indexes 1 and 2 are assigned to the physical antennas of the BS 100 in a circulative manner while the high-speed train 500 runs, reception antennas of the high-speed train 500 need to measure channels as the high-speed train 500 moves. At this time, the reception antennas of the high-speed train 500 require a decoding procedure for all pilot patterns.

However, if the BS 100 shifts the logical antenna indexes as the high-speed train 500 moves, the reception antennas of the high-speed train 500 may decode only a predetermined specific pilot pattern. It is assumed that the BS 100 assigns logical antenna index 1 to physical antenna #1, logical antenna index 2 to physical antenna #2, logical antenna index 1 to physical antenna #3, and logical antenna index 2 to physical antenna #4 in the initial stage, as shown in FIG. 5. As the high-speed train 500 moves, the BS 100 can shift the logical antenna index of physical antenna #2 from 2 to 1 and shift the logical antenna index of physical antenna #3 from 1 to 2. If the BS 100 shifts the logical antenna indexes according to movement of the high-speed train 500, the reception antennas of the high-speed train 500 can decode only a predetermined pilot pattern to receive a signal.

In the above-described communication system according to the present invention, a plurality of antennas is arranged such that link capacity between a high-speed train moving on a track or railroad and a network can be maximized for passengers of the high-speed train, as described above. This system can be equally applied to vehicles moving along a fixed route in a predetermined section, such as a freeway. In the communication system according to the present invention, the coverage of a BS (e.g. femtocell coverage) is determined on the basis of a route or track of a vehicle. It is possible to secure sufficient spatial multiplexing order through antennas arranged in a distributed manner along a route or track of a vehicle and enable large-capacity data transmission. From the point at which the coverage of the distributed antennas ends, the vehicle can be linked to a BS of a normal cell to continue communication with a network.

In the above descriptions of FIGS. 2, 3, 4 and 5, a rapidly moving MS on the high-speed train 200, 300, 400 and 500 can receive a signal transmitted from the BS 100 through a specific reception antenna or a specific reception antenna group allocated thereto (e.g. a specific reception antenna or a specific reception antenna group of the high-speed train, which is arranged in a car of the high-speed train, in which the MS is located).

If the distance between the BS 100 and the high-speed train is short and LOS is dominant, frame structures, previously defined and proposed, need to be newly redefined to be adapted to this channel environment. Frame structures of IEEE (Institute of Electrical and electronics Engineers) 802.16e, IEEE 802.16m, 3GPP LTE ($3^{rd}$ Generation Partnership Project Long Term Evolution), 3GPP LTE-A systems are illustrated in FIG. 6.

FIG. 6(a) illustrates an exemplary frame structure of the IEEE 802.16m system and FIG. 6(b) illustrates an exemplary frame structure of the 3GPP LTE system.

Referring to FIG. 6(a), in the IEEE 802.16m system, one of AAI (Advanced Air Interface) systems, one frame has a plurality of subframes each including a plurality of subcarriers in the frequency domain and a plurality of OFDM symbols in the time domain. Some of the subframes included in one frame are used to transmit uplink data and others are used to transmit downlink data. Each 20 ms superframe is equally divided into four 5 ms frames. Each 5 ms frame has one of channel bandwidths 5 MHz, 10 MHz and 20 MHz and its radio frame can include seven or eight subframes according to channel bandwidth.

The BS 100 can transmit system information, control information and the like to the MS 180 using a control channel in the frame structure and transmit data to the MS 180 using a frame region other than the control channel. The control channel through which the BS 100 transmits control information to the MS 180 includes a superframe header (SFH), A-MAP (Advanced-MAP), etc. The SFH can include a P-SFH (Primary Superframe Header) and a S-SFH (Secondary Superframe Header). The SFH is a channel used to broadcast essential or additional system information to the MS 180. That is, the BS 100 can transmit the SFH to the MS 180 to help the MS 180 when the MS 180 is powered on to initially enter a network, re-enter the network, or perform handover.

Referring to FIG. 6(b), in the 3GPP LTE system, one radio frame has a length of 10 ms (327200×Ts) and includes ten equal subframes. Each subframe has a length of 1 ms and includes two slots each having a length of 0.5 ms (15360×Ts). Here, Ts is sampling time and is represented as Tx=1/(15 kHz×2048)=3.2552×$10^{-8}$ (about 33 ns). One slot includes a plurality of OFDM symbols or SC-FDMA symbols in the time domain and a plurality of resource blocks in the frequency domain.

In an LTE system, one resource block includes 12 subcarrier×7 (or 6) OFDM symbols or SC-FDMA (Single Carrier-Frequency Division Multiple Access) symbols. A TTI (Transmission Time Interval), a unit time interval in which data is transmitted, can be determined based on one or more subframes. The above radio frame structure is exemplary and as such the number of subframes included in one radio frame, the number of slots included in one subframe, and the number of OFDM symbols or SC-FDMA symbols included in one slot can be changed.

Conventional frame structures commonly include superframes, frames, subframes, and slots in the time domain and has a resource block (RB) or resource unit (RU) corresponding to a set of a plurality of subcarriers as a minimum unit in the frequency domain. The frame structures use a CP (Cyclic Prefix) inserted into each OFDM symbol in order to prevent signal distortion due to multipath delay in communication between the BS 100 and the MS 180.

The 3GPP LTE and IEEE 802.16m systems that are mobile communication systems use OFDM (Orthogonal Frequency Division Multiplexing) as a multicarrier modulation scheme. A description will be given of the basic principle of OFDM.

In OFDM systems, a high-rate data stream is segmented into a large number of low-rate data streams in order to simultaneously transmit data using a plurality of carriers. These carriers are called subcarriers. Since a plurality of carriers has orthogonality in the OFDM systems, a receiver can detect frequency components of carriers even if they are overlapped. A high-rate data stream can be converted into a plurality of low-rate data streams through a serial-to-parallel converter, and the plurality of parallel low-rate data streams can be respectively multiplied by subcarriers and summed up, and then transmitted to the receiver.

The plurality of parallel data streams converted by the serial-to-parallel converter can be transmitted through a plurality of subcarriers using IDFT (Inverse Discrete Fourier Transform). Here, IDFT can be efficiently implemented using IFFT (Inverse Fast Fourier Transform). Due to an increase in symbol duration of a low-rate subcarrier, relative signal dispersion in the time domain, caused by multipath delay spread, is reduced.

In wireless communication using OFDM, a guard interval longer than channel delay spread may be inserted between symbols in order to reduce inter-symbol interference. That is, a guard interval longer than maximum delay spared of a multipath channel is inserted between contiguous symbols while symbols are transmitted through the multipath channel. At this time, a signal of the last part (i.e., guard interval) of an effective symbol interval is copied and placed at the head of the effective symbol interval in order to prevent orthogonality between subcarriers from being broken. This is called CP (Cyclic Prefix).

Figure 7:
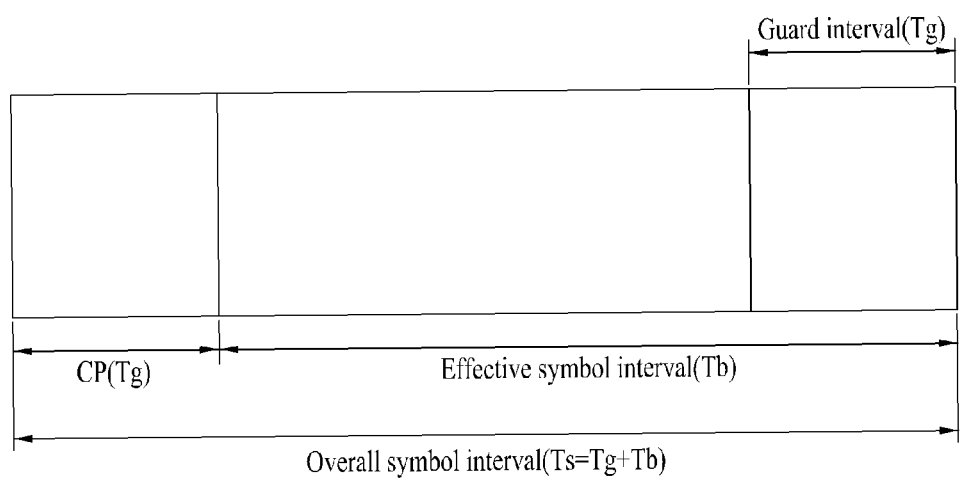
FIG. 7 illustrates an exemplary symbol structure including a CP (Cyclic Prefix) in a mobile communication system.

FIG. 7 illustrates an exemplary symbol structure including CP in a mobile communication system.

Referring to FIG. 7, a symbol interval Ts corresponds to the sum of an effective symbol interval Tb in which actual data is transmitted and a guard interval Tg. A receiver removes the guard interval Tg from the symbol interval and then demodulates data corresponding to the effective symbol interval Tb. The receiver can be synchronized with a transmitter using CP and inter-symbol orthogonality can be maintained.

In the antenna arrangement according to the present invention, however, signal distortion caused by delay does not occur even if CP is omitted because a distance between a transmit antenna and a reception antenna is very short and LOS is maintained. Accordingly, the present invention proposes a frame structure capable of securing a larger amount of resources by eliminating CP included in the conventional frame structures or reducing the CP length (or time) while maintaining commonality with the conventional frame structures. Since the IEEE 802.16m and LTE/LTE-A systems use a subframe as a minimum scheduling unit, the length of the subframe is preferably maintained as 5 ms and 1 ms for the IEEE 802.16m and LTE/LTE-A systems respectively.

A description will be given of a frame structure based on the frame structure of the IEEE 802.16m system, which does not include CP to be adapted to the channel environment proposed by the present invention.

Table 1 shows parameters of an IEEE 802.16m based frame structure for LOS channel and a short distance between transmit and receive antennas.

TABLE 1

| | | 5 | 7 | 8.75 | 10 | 20 |
|---|---|---|---|---|---|---|
| The nominal channel bandwidth, BW (MHz) | | 5 | 7 | 8.75 | 10 | 20 |
| Sampling factor, n | | 28/25 | 8/7 | 8/7 | 28/25 | 28/25 |
| Sampling frequency, Fs (MHz) | | 5.6 | 8 | 10 | 11.2 | 22.4 |
| FFT size, NFFT | | 512 | 1024 | 1024 | 1024 | 2048 |
| Subcarrier spacing, $\Delta f$ (kHz) | | 10.94 | 7.81 | 9.77 | 10.94 | 10.94 |
| Useful Symbol time, Tb (ms) | | 91.4 | 128 | 102.4 | 91.4 | 91.4 |
| CP ratio, G = 0 | OFDMA symbol time, $T_s$ (ms) | 91.4 | 128 | 102.4 | 91.4 | 91.4 |
| | FDD No. of OFDMA Symbols per 5 ms frame | 54 | 39 | 48 | 54 | 54 |
| | Idle time (ms) | 64.4 | 8 | 84.8 | 64.4 | 64.4 |
| | TDD No. of OFDMA Symbols per 5 ms frame | 53 | 38 | 47 | 53 | 53 |
| | TTG + RTG (ms) | 155.8 | 136 | 187.2 | 155.8 | 155.8 |
| CP ratio, G = 1/32 | OFDMA Symbol time, $T_s$ (ms) | 94.286 | 132 | 105.6 | 94.286 | 94.286 |
| | FDD No. of OFDMA Symbols per 5 ms frame | 53 | 37 | 47 | 53 | 53 |
| | Idle time (ms) | 2.857 | 116 | 36.8 | 2.857 | 2.857 |
| | TDD No. of OFDMA Symbols per 5 ms frame | 52 | 36 | 46 | 52 | 52 |
| | TTG + RTG (ms) | 97.143 | 248 | 142.4 | 97.143 | 97.143 |
| CP ratio, G = 1/64 | OFDMA Symbol time, $T_s$ (ms) | 92.857 | 130 | 104 | 92.857 | 92.857 |
| | FDD No. of OFDMA Symbols per 5 ms frame | 53 | 38 | 48 | 53 | 53 |
| | Idle time (ms) | 78.571 | 60 | 80 | 78.571 | 78.571 |
| | TDD No. of OFDMA Symbols per 5 ms frame | 52 | 37 | 47 | 52 | 52 |
| | TTG + RTG (ms) | 171.43 | 190 | 112 | 171.43 | 171.43 |
| CP ratio, G = 1/128 | OFDMA symbol time, $T_s$ (ms) | 92.143 | 129 | 103.2 | 92.143 | 92.143 |
| | FDD No. of OFDMA Symbols per 5 ms frame | 54 | 38 | 48 | 54 | 54 |
| | Idle time (ms) | 24.286 | 98 | 46.4 | 24.286 | 24.286 |
| | TDD No. of OFDMA Symbols per 5 ms frame | 53 | 37 | 47 | 53 | 53 |
| | TTG + RTG (ms) | 116.429 | 227 | 149.6 | 116.429 | 116.429 |

A description will be given of a frame structure based on a CP ratio G and channel bandwidth with reference to Table 1. The CP ratio is a ratio of a CP length (or time) to an effective symbol length (or time). IEEE 802 systems define and use several subframe types. Type-1 subframes include six OFDMA symbols and Type-2 subframes include seven OFDMA symbols, and Type-3 subframes include five OFDMA symbols.

1. CP Ratio G=0

(1) Case of System for Channel Bandwidths of 5 MHz, 10 MHz and 20 MHz

One superframe (20 ms) consists of four 5 ms frames and one frame includes eight subframes. If this frame structure is maintained, one frame of an FDD system with CP ratio=0 consists of six Type-2 subframes (each including seven OFDMA symbols) and two Type-1 subframes (each including six OFDMA symbols). In TDD systems for channel bandwidths of 5 MHz, 10 MHz and 20 MHz, one frame can include five Type-2 subframes and three Type-1 subframes.

(2) Case of System for Channel Bandwidth of 7 MHz

In case of an FDD system for a channel bandwidth of 7 MHz, one frame includes three Type-2 subframes and three Type-1 subframes. For a TDD system for a channel bandwidth of 7 MHz, one frame can include two Type-2 subframes and four Type-1 subframe.

(3) Case of System for Channel Bandwidth of 8.75 MHz

In case of an FDD system for a channel bandwidth of 8.75 MHz, one frame includes six Type-2 subframes and one Type-1 subframe. For a TDD system for a channel bandwidth of 8.75 MHz, one frame can include five Type-2 subframes and two Type-1 subframe.

2. CP Ratio G=1/32 (i.e., CP Length Equals 1/32 of Effective Symbol Length)

(1) Case of System for Channel Bandwidths of 5 MHz, 10 MHz and 20 MHz

One frame of an FDD system with a CP ratio of 1/32 can include five Type-2 subframes (each including seven OFDMA symbols) and three Type-1 subframes (each including six OFDMA symbols). One frame of a TDD system with a CP ratio of 1/32 can include four Type-2 subframes and four Type-1 subframes.

(2) Case of System for Channel Bandwidth of 7 MHz

One frame can consist of (or include) one Type-2 subframe and five Type-1 subframes in an FDD system for a channel bandwidth of 7 MHz whereas one frame can consist of six Type-1 subframes in a TDD system for a channel bandwidth of 7 MHz.

(3) Case of System for Channel Bandwidth of 8.75 MHz

One frame can consist of five Type-2 subframes and two Type-1 subframes in an FDD system for a channel bandwidth of 8.75 MHz whereas one frame can consist of four Type-2 subframes and three Type-1 subframes in a TDD system for a channel bandwidth of 8.75 MHz.

3. CP Ratio G=1/64 (i.e., CP Length Equals 1/64 of Effective Symbol Length)

(1) Case of System for Channel Bandwidths of 5 MHz, 10 MHz and 20 MHz

In case of systems having channel bandwidths of 5 MHz, 10 MHz and 20 MHz, one frame of an FDD system with a CP ratio of 1/64 can include five Type-2 subframes (each including seven OFDMA symbols) and three Type-1 subframes (each including six OFDMA symbols). One frame of a TDD system can include four Type-2 subframes and four Type-1 subframes.

(2) Case of System for Channel Bandwidth of 7 MHz

One frame can consist of two Type-2 subframes and four Type-1 subframes in an FDD system for a channel bandwidth of 7 MHz whereas one frame can consist of one Type-2 subframe and five Type-1 subframes in a TDD system for a channel bandwidth of 7 MHz.

(3) Case of System for Channel Bandwidth of 8.75 MHz

One frame can consist of (or include) six Type-2 subframes and one Type-1 subframe in an FDD system for a channel bandwidth of 8.75 MHz whereas one frame can consist of five Type-2 subframes and two Type-1 subframes in a TDD system for a channel bandwidth of 8.75 MHz.

4. CP Ratio G=1/128 (i.e., CP Length Equals 1/128 of Effective Symbol Length)

(1) Case of System for Channel Bandwidths of 5 MHz, 10 MHz and 20 MHz

One frame of an FDD system with a CP ratio of 1/128 can include six Type-2 subframes and two Type-1 subframes. One frame of a TDD system can include five Type-2 subframes and three Type-1 subframes.

(2) Case of System for Channel Bandwidth of 7 MHz

One frame can consist of two Type-2 subframes and four Type-1 subframes in an FDD system for a channel bandwidth of 7 MHz whereas one frame can consist of one Type-2 subframe and five Type-1 subframes in a TDD system for a channel bandwidth of 7 MHz.

(3) Case of System for Channel Bandwidth of 8.75 MHz

One frame can consist of six Type-2 subframes and one Type-1 subframe in an FDD system for a channel bandwidth of 8.75 MHz whereas one frame can consist of five Type-2 subframes and two Type-1 subframes in a TDD system for a channel bandwidth of 8.75 MHz.

While OFDMA parameters have been proposed in four cases of CP ratios of 0, 1/32 1/64 and 1/128, as shown in Table 1, the CP ratio of 1/64 or 1/128 may be preferable in consideration of timing synchronization error.

A description will be made of a frame structure from which CP has been removed to suit a channel environment on the basis of frame structures of 3GPP LTE and LTE-A systems according to the present invention.

In the frame structure of the LTE system, one frame consists of ten subframes each including two slots. In case of normal CP, one slot includes seven OFDMA symbols and a CP length of the first OFDMA symbol of one slot is 160 Ts and a CP length of the other OFDMA symbols is 144 Ts. Here, Ts (=1/(15000×2048) seconds) is a basic time unit. When the CP length is set to 0 while this frame structure is maintained, one subframe may include 15 OFDMA symbols and one slot may consist of 7.5 OFDMA symbols. Otherwise, one subframe may include 15 OFDMA symbols and two slots may respectively consist of 7 and 8 OFDMA symbols.

The above-mentioned frame structures, newly proposed for the IEEE 802.16m and 3GPP LTE system according to the present invention, use a short interval of antennas, which is a characteristic of a communication system having antennas arranged at a short interval along a moving route of a high-speed moving body. These frame structures enable large-capacity data communication between the high-speed moving object and a network.

It will be apparent to those skilled in the art that various modifications and variations can be made in the present invention without departing from the spirit or scope of the invention.

Thus, it is intended that the present invention cover the modifications and variations of this invention provided they come within the scope of the appended claims and their equivalents.

Industrial Applicability

The apparatus and method for transceiving a signal using a predetermined frame structure in a wireless communication system can be applied to wireless communication systems such as 3GPP LTE, LTE-A, IEEE 802 systems, etc.

What is claimed is:

1. A method for transceiving signals using a predetermined frame structure in a wireless communication system, the method comprising:

transceiving signals via a frame based on the predetermined frame structure, wherein one frame is constituted by 8 subframes in the predetermined frame structure, and the frame consists of a type-1 subframe consisting of 6 OFDMA (Orthogonal Frequency Division Multiple Access) symbols and a type-2 subframe consisting of 7 OFDMA symbols, and the frame has a CP (Cyclic Prefix) time which is either 0, 1/32 of an effective symbol time, 1/64 of the effective symbol time, or 1/128 of the effective symbol time.

2. The method of claim 1, wherein the frame is a TDD (Time Division Duplex) frame or a FDD (Frequency Division Duplex) frame.

3. The method of claim 2, wherein the FDD frame consists of 2 Type-1 subframes and 6 Type-2 subframes when the CP time is 0 or 1/128 of the effective symbol time.

4. The method of claim 2, wherein the FDD frame consists of 3 Type-1 subframes and 5 Type-2 subframes when the CP time is 1/32 or 1/64 of the effective symbol time.

5. The method of claim 2, wherein the TDD frame consists of 3 Type-1 subframes and 5 Type-2 subframes when the CP time is 0 or 1/128 of the effective symbol time.

6. The method of claim 2, wherein the TDD frame consists of 4 Type-1 subframes and 4 Type-2 subframes when the CP time is 1/32 or 1/64 of the effective symbol time.

7. A method for transceiving signals using a predetermined frame structure in a wireless communication system, the method comprising:
transceiving signals via a frame based on the predetermined frame structure,
wherein one frame is constituted by 10 subframes in the predetermined frame structure, each subframe consisting of 2 slots including 15 OFDMA symbols, and the frame has a CP time of 0,
wherein each of the 2 slots consists of 7.5 OFDMA symbols, or
wherein a first slot of the 2 slots consists of 7 OFDMA symbols and a second slot of the 2 slots consists of 8 OFDMA symbols.

8. An apparatus for transceiving signals using a predetermined frame structure in a wireless communication system, the apparatus comprising:
a processor configured to control operation to transceive a signal via a frame based on the predetermined frame structure,
wherein one frame is constituted by 8 subframes in the predetermined frame structure, and the frame consists of a type-1 subframe consisting of 6 OFDMA symbols and a type-2 subframe consisting of 7 OFDMA symbols, and the frame has a CP time which is either 0, 1/32 of an effective symbol time, 1/64 of the effective symbol time, or 1/128 of the effective symbol time.

9. The apparatus of claim 8, wherein the frame is a TDD (Time Division Duplex) frame or an FDD (Frequency Division Duplex frame).

10. The apparatus of claim 9, wherein the FDD frame consists of 2 Type-1 subframes and 6 Type-2 subframes when the CP time is 0 or 1/128 of the effective symbol time.

11. The apparatus of claim 9, wherein the FDD frame consists of 3 Type-1 subframes and 5 Type-2 subframes when the CP time is 1/32 or 1/64 of the effective symbol time.

12. The apparatus of claim 9, wherein the TDD frame consists of 3 Type-1 subframes and 5 Type-2 subframes when the CP time is 0 or 1/128 of the effective symbol time.

13. The apparatus of claim 9, wherein the TDD frame consists of 4 Type-1 subframes and 4 Type-2 subframes when the CP time is 1/32 or 1/64 of the effective symbol time.

14. An apparatus for transceiving signals using a predetermined frame structure in a wireless communication system, the apparatus comprising:
a processor configured to control operation to transceive signals via a frame having the predetermined frame structure,
wherein one frame is constituted by 10 subframes in the frame structure, each subframe consisting of 2 slots including 15 OFDMA symbols, and the frame has a CP time of 0,
wherein each of the 2 slots consists of 7.5 OFDMA symbols, or
wherein a first slot of the 2 slots consists of 7 OFDMA symbols and a second slot of the 2 slots consists of 8 OFDMA symbols.

* * * * *